(12) United States Patent
Mink

(10) Patent No.: US 8,096,470 B2
(45) Date of Patent: Jan. 17, 2012

(54) UPBOARD CUSTOMER RELATIONSHIP MANAGEMENT SYSTEM

(75) Inventor: David Paul Mink, Houston, TX (US)

(73) Assignee: Dave Mink

( * ) Notice: Subject to any disclaimer, the term of this patent is extended or adjusted under 35 U.S.C. 154(b) by 654 days.

(21) Appl. No.: 11/636,846

(22) Filed: Dec. 11, 2006

(65) Prior Publication Data

US 2008/0140496 A1   Jun. 12, 2008

(51) Int. Cl.
*G06K 15/00* (2006.01)

(52) U.S. Cl. ......................................... 235/383; 235/385

(58) Field of Classification Search .................. 235/384, 235/385, 381, 379, 439, 383; 705/14, 10, 705/26, 51, 52, 53
See application file for complete search history.

(56) References Cited

U.S. PATENT DOCUMENTS

| | | | |
|---|---|---|---|
| 5,930,764 A * | 7/1999 | Melchione et al. | 705/10 |
| 6,961,714 B1 * | 11/2005 | LeVine | 705/51 |
| 7,191,939 B2 * | 3/2007 | Beck et al. | 235/380 |
| 7,252,230 B1 * | 8/2007 | Sheikh et al. | 235/439 |
| 7,469,826 B2 * | 12/2008 | Ciancio et al. | 235/383 |
| 2005/0055275 A1 * | 3/2005 | Newman et al. | 705/14 |
| 2005/0171862 A1 * | 8/2005 | Duncan | 705/26 |
| 2005/0222906 A1 * | 10/2005 | Chen | 705/14 |

* cited by examiner

*Primary Examiner* — Thien M Le

(57) ABSTRACT

A system for tracking sales activity and enhancing customer relationships comprising at least one processor, data storage connected to the processor, at least one input device connected to the data storage and processor, a clock means for generating a time record, and computer instructions for: receiving and tracking sales commitments and individual sales data by sales account code and time, tracking the steps of the sales process, tracking total and average time spent with each customer, providing a logical comparison between sales data and steps of the sales process using a discrete event modeling and simulation method to monitor and forecast sales, providing an alarm to at least one client device when sales data reflects sales occurring below sale commitments, and providing customer data relating to an event that brought the customer, items viewed, amount of sales per customer, the customer's address, and reasons for inconclusive sale.

19 Claims, 10 Drawing Sheets

FIG. 2

UPBOARD FOR .SAMPLE COMPANY MULTIPLE LOCATIONS - HOUSTON
© 1996 - 2006 Mink-Inc, Patent Pending
Training Videos and Manual    Customer Cases    Open Upboard 1

Performance Summary Report
06/29/2002 08:07 PM — 804    806 — 05/01/2002 to 05/31/2002 — 802    Page 1 of 1

| Salesperson | PPO* | Hours | Total Sales | Accessories Net Amount | Accessories Sales Ratio | # Sales | # Items | # Opps | # Per Trade | Per Trade Ratio | # Wait | Wait Amount | Wait Ratio | % to Total Sales | Average Sale | Items Per Sale | Sales Per Hour | Closing Ratio |
|---|---|---|---|---|---|---|---|---|---|---|---|---|---|---|---|---|---|---|
| Arnold | $230.13 | 172.3 | $39,768.16 | $0.00 | 0.0 | 31.0 | 46.0 | 167.0 | 1.0 | 0.6 | 0.0 | $0.00 | 0.0 | 0.0 | $1,282.65 | 1.5 | $230.81 | 18.6 |
| Nicole | $0.00 | 0.1 | $0.00 | $0.00 | 0.0 | 0.0 | 0.0 | 0.0 | 0.0 | | 0.0 | $0.00 | 0.0 | 0.0 | $0.00 | 0.0 | $0.00 | 0.0 |
| Mitch | $262.78 | 168.5 | $44,673.12 | $0.00 | 0.0 | 27.0 | 34.0 | 170.0 | 0.0 | 0.0 | 0.0 | $0.00 | 0.0 | 0.0 | $1,654.57 | 1.3 | $265.12 | 15.9 |
| Joe | $397.73 | 158.2 | $64,432.64 | $0.00 | 0.0 | 46.0 | 44.0 | 162.0 | 0.0 | 0.0 | 0.0 | $0.00 | 0.0 | 0.0 | $1,400.71 | 1.0 | $407.29 | 28.4 |
| Robbie | $277.77 | 173.0 | $57,060.86 | $0.00 | 0.0 | 45.5 | 84.5 | 205.5 | 0.0 | 0.0 | 0.0 | $0.00 | 0.0 | 0.0 | $1,254.32 | 1.9 | $329.95 | 22.1 |
| Taylor | $408.43 | 136.7 | $58,322.03 | $0.00 | 0.0 | 40.5 | 87.5 | 143.5 | 0.0 | 0.0 | 0.0 | $0.00 | 0.0 | 0.0 | $1,440.05 | 2.2 | $426.64 | 28.1 |
| Natalie | $0.00 | 0.0 | $0.00 | $0.00 | 0.0 | 0.0 | 0.0 | 0.0 | 0.0 | | 0.0 | $0.00 | 0.0 | 0.0 | $0.00 | 0.0 | $0.00 | 0.0 |
| L | $420.82 | 163.6 | $57,651.67 | $0.00 | 0.0 | 43.0 | 43.0 | 137.0 | 0.0 | 0.0 | 0.0 | $0.00 | 0.0 | 0.0 | $1,340.74 | 1.0 | $352.39 | 31.4 |
| Tricia | $621.89 | 83.4 | $55,658.87 | $0.00 | 0.0 | 27.5 | 32.5 | 89.5 | 0.0 | 0.0 | 0.0 | $0.00 | 0.0 | 0.0 | $2,023.96 | 1.2 | $629.63 | 30.7 |
| Denise | $289.59 | 115.7 | $36,199.90 | $0.00 | 0.0 | 25.0 | 60.5 | 125.0 | 0.0 | 0.0 | 0.0 | $0.00 | 0.0 | 0.0 | $1,447.96 | 2.4 | $312.67 | 20.0 |
| Ray | $298.60 | 106.3 | $34,405.28 | $0.00 | 0.0 | 22.0 | 22.5 | 116.0 | 0.0 | 0.0 | 0.0 | $0.00 | 0.0 | 0.0 | $1,563.88 | 1.0 | $323.66 | 19.0 |
| Dee | $307.10 | 155.1 | $58,963.75 | $0.00 | 0.0 | 45.0 | 49.0 | 192.0 | 1.0 | 0.5 | 0.0 | $0.00 | 0.0 | 0.0 | $1,310.31 | 1.1 | $380.17 | 23.4 |
| Daniel | $0.00 | 0.0 | $0.00 | $0.00 | 0.0 | 0.0 | 0.0 | 0.0 | 0.0 | | 0.0 | $0.00 | 0.0 | 0.0 | $0.00 | 0.0 | $0.00 | 0.0 |
| Chloe | $197.77 | 140.5 | $35,894.37 | $0.00 | 0.0 | 30.5 | 30.5 | 181.5 | 0.0 | 0.0 | 0.0 | $0.00 | 0.0 | 0.0 | $1,176.06 | 1.0 | $255.48 | 16.8 |
| Gary | $427.00 | 151.2 | $67,252.24 | $0.00 | 0.0 | 49.5 | 63.5 | 157.5 | 0.0 | 0.0 | 0.0 | $0.00 | 0.0 | 0.0 | $1,358.63 | 1.3 | $444.79 | 31.4 |
| Rene | $0.00 | 0.0 | $0.00 | $0.00 | 0.0 | 0.0 | 0.0 | 0.0 | 0.0 | | 0.0 | $0.00 | 0.0 | 0.0 | $0.00 | 0.0 | $0.00 | 0.0 |
| Gus | $344.07 | 148.8 | $55,567.21 | $0.00 | 0.0 | 43.5 | 53.0 | 161.5 | 0.0 | 0.0 | 0.0 | $0.00 | 0.0 | 0.0 | $1,277.41 | 1.2 | $373.44 | 26.9 |
| Mandy | $206.08 | 203.6 | $48,673.45 | $0.00 | 0.0 | 36.5 | 37.0 | 235.5 | 0.0 | 0.0 | 0.0 | $0.00 | 0.0 | 0.0 | $1,333.52 | 1.0 | $239.06 | 15.5 |
| L | $297.29 | 119.6 | $37,456.77 | $0.00 | 0.0 | 31.0 | 33.0 | 126.0 | 0.0 | 0.0 | 0.0 | $0.00 | 0.0 | 0.0 | $1,208.35 | 1.1 | $313.20 | 24.6 |
| Samantha | $194.50 | 167.6 | $27,882.60 | $0.00 | 0.0 | 34.5 | 73.5 | 169.5 | 0.0 | 0.0 | 0.0 | $0.00 | 0.0 | 0.0 | $808.19 | 2.1 | $166.36 | 20.4 |
| Totals: | $297.16 | 2345.2 | $779,884.12 | $0.00 | 0.0 | 578.0 | 794.0 | 2539.0 | 2.0 | 0.1 | 0.0 | $0.00 | 0.0 | 0.0 | $1,349.28 | 1.4 | $329.18 | 22.8 |

808    810 812    814    816    813    820    822    824    826    828    830    832    834

* PPO - Performance Per Opportunity

Advertising Analysis for Previous Month: April 2002

Total Advertising Expense: $105,694.00    Avg Advertising Cost per Opportunity: $146.00    Avg Advertising Cost per Sale: $500.00

Patent Pending © 1997 - 2002 Mink-Inc. (888) 646-5462

UPBOARD CUSTOMER RELATIONSHIP MANAGEMENT SYSTEM

FIELD

A system to track sales and sale data, and analyze sale data in relation to time, customer, and sales account information for the purpose of forecasting sales, improving customer relationships, and generating one or more alarms.

BACKGROUND

A need has long existed for methods for managing customer relationships which relate to the traffic through a facility.

With the advent of automated sales tracking systems, which can track individual sales and products, it has become possible to tie sales tracking systems to other systems and to add notification systems to these software programs and methods.

There exists a need for tracking individual sales by product category, such as furniture, flooring, or retail, by location, such as by showroom or showroom location, by budget, or a combination.

There exists a need for the creation of various systems for customer follow-up including drafting of letters. In addition, needs have also existed for automatic calendaring, word processing, performance summaries, and time sheets to be tied to individual sales.

There exists a need for a system that requires salespeople to use a customer relationship system with every customer.

There exists a need to require salespeople to capture information on every prospective customer before they are allowed to greet another customer The present invention addresses these long felt needs.

BRIEF DESCRIPTION OF THE DRAWINGS

The detailed description will be better understood in conjunction with the accompanying drawings as follows:

FIG. 2 shows the system's main window to allow the user to enter customer data.

FIG. 4 shows the system's customer details window.

FIG. 6 shows the system's customer search window.

FIG. 9 shows an example of the system's chart format report, the performance summary report.

Figure 1:
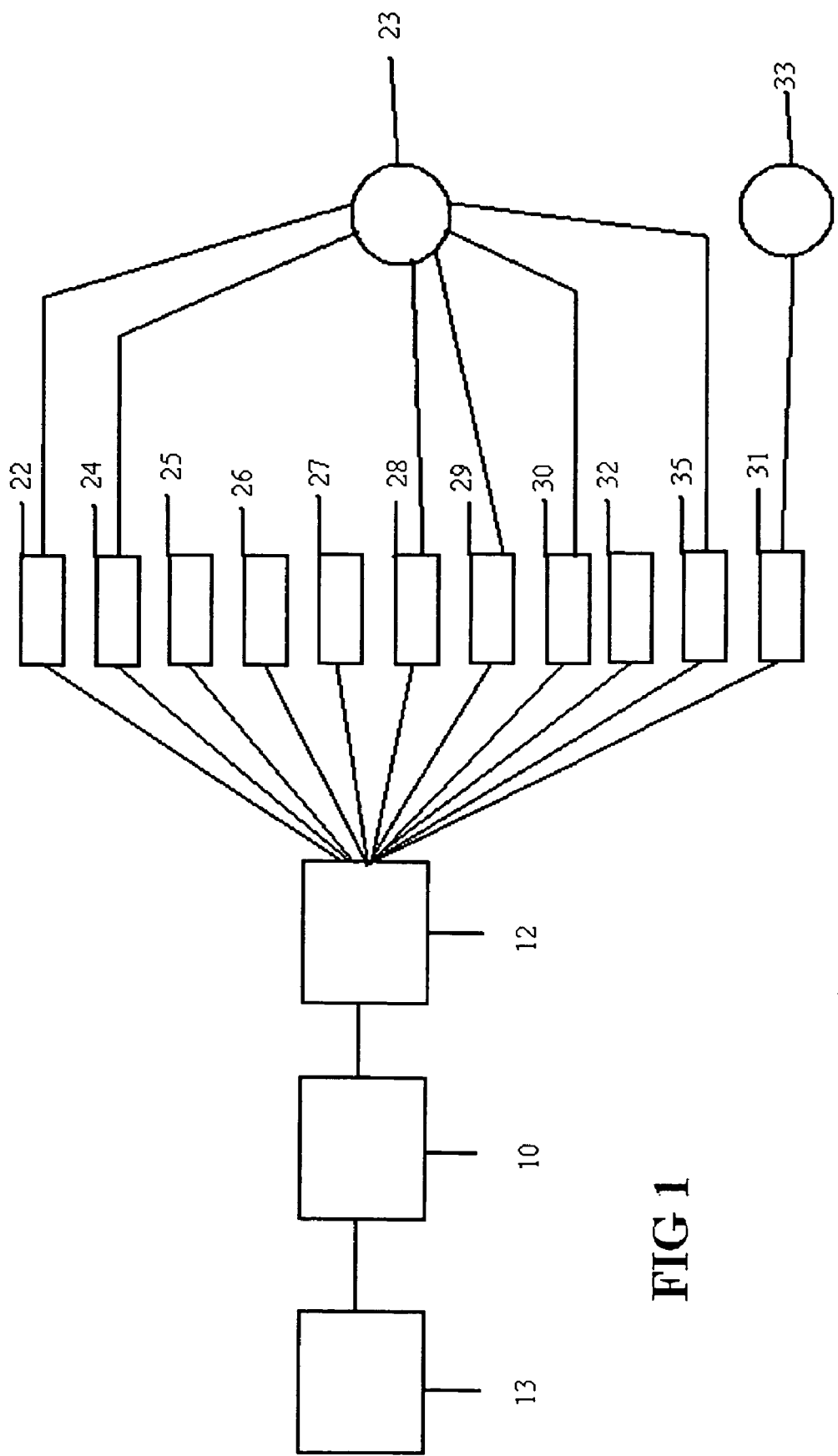
FIG. 1 depicts a schematic chart showing an overview of the system.

The present embodiments are detailed below with reference to the listed Figures.

DETAILED DESCRIPTION OF THE EMBODIMENTS

Before explaining the present invention in detail, it is to be understood that the invention is not limited to the particular embodiments and that it can be practiced or carried out in various ways.

The system for customer relationship management can involve tracking sales person commitments and alarming certain sales commitments for action by a sales person. Examples of sales commitments can be improvements of sales presentation skills on a product. Examples of alarms can be emails, to-do reports, printed notices, standardized reports, faxed reports directly from a processor, and combinations thereof.

In an embodiment, the alarms can also include leaving a voice message on a client device. Further, the alarms can be transmitted automatically on a real time basis.

An embodiment of the customer relationship management system can be a system for tracking sales, tracking sales activity without purchase, and enhancing customer relationships. The customer relationship management system can utilize components including but not limited to at least one processor, data storage connected to the processor, and at least one input device connected to both the processor and data storage.

An input device can be a personal digital assistant (PDA), a wireless phone, a blackberry™, a palm computer, a laptop computer, a pager, a cellular phone, a land phone, another computer, a web interface, or combinations thereof.

The data storage can comprise computer instructions for receiving sales commitments from at least one sales account code using the input device, and computer instructions for tracking sales commitments input by date, hour, minute, and second for each sales account code.

A sales account code can represent a facility, a particular showroom, a designated group of sales people, or an individual sales person. A secondary sales account code can represent a manager of at least one sales person.

The data storage can also comprise computer instructions for tracking steps of the sales process, which comprise: greeting of a customer, qualification of the customer, needs analysis of the customer, presentation of product, service, or both product and service to the customer, demonstration of product, service, or both product and service to the customer, and trial close.

The data storage can further comprise computer instructions for receiving individual sales data by sales account code, by date, hour, minute, and second on an ongoing basis.

The data storage can also comprise clock means for generating a time record linked to the computer instructions, the clock means comprising a date, hour, minute, and second when sales commitments are received by the processor and when individual sales data are received by the processor.

The data storage can additionally comprise computer instructions for tracking total time spent with each customer by sales account code, and computer instructions for compiling an average of total time spent with each customer by sales account code.

The data storage can also comprise computer instructions for providing a logical comparison between sales data, steps of the sales process, and sales commitments, in relationship to the clock means. The logical comparison can be established using a discrete event modeling and simulation method to monitor and forecast individual sales corresponding to at least one sales account code.

The results of the logical comparison can be used to produce reports, charts, images such as bar graphs or pie charts, other types of images and reports, and combinations thereof.

The data storage can comprise computer instructions to provide at least one alarm to at least one client device related to at least one sales account code and to a secondary sales account code when sales data reflects sales occurring below sale commitments.

The data storage can also comprise computer instructions for providing customer data to selected sales account codes, the customer data comprising: an event that brought in the customer; items viewed by a customer; dollar amounts of actual sales per customer; at least a portion of an address of a customer; and reasons for inconclusive sale with customer.

Further, the data storage can comprise computer instructions to prevent a sales account code of the sales individual from being entered into a queue to greet new customers on a sales floor if the sales account code fails to supply customer data to the system. The computer instructions can also include the steps of the sales process that have been taken by the sales person associated with the sales account code.

The data storage can also comprise computer instructions to provide an overflow analysis report indicating when all sales account codes are engaging customers on a sales floor. An overflow analysis report can be shown as charts, tables, or other representations.

The system can also include computer instructions for tracking a sales process by steps of the sales process. The steps that are tracked can be the step of sketching a customer installation, setting up a house call, or combinations thereof.

In an embodiment, it is also contemplated that the discrete event modeling and simulation method can comprise computer instructions to enable sales to be customized relative to a type of company.

The discrete event modeling and simulation method can further comprise computer instructions to enable at least one individual sales person to work with multiple customers simultaneously. This can be accomplished by selecting keys on a keyboard that creates a count of the number of clients a salesperson is currently with.

Additionally, it is contemplated that the discrete event modeling simulation method can comprise computer instructions to enable the individual salesperson to log into and access the system without being tracked by the system.

The discrete event modeling and simulation method can also comprise computer instructions to provide a continuously rotating priority queue for sales account codes in real time, the sales account codes identifying which sales person is designated to approach a new customer on a sales floor.

Also, the discrete event modeling and simulation method can comprise computer instructions to provide a notice to at least one client device corresponding to a sales account code of a sales person located in a defined zone to approach a new customer on the sales floor.

A client device can be a personal digital assistant (PDA), a wireless phone, a blackberry™, a palm computer, a laptop computer, a pager, a cellular phone, a land phone, another computer, a web interface, or combinations thereof. It is also contemplated that the client device can be the input device.

It is contemplated that in an embodiment, the processor can be in communication with a network. It is also contemplated that the processor and client devices can be connected by the network. The network can be a wireless network, a wide area network, a local area network, a virtual private area network, or combinations thereof.

In an embodiment, the processor can cause the computer instructions to provide at least one alarm, simultaneously through at least two internet gateway protocols, to communicate simultaneously with at least two different client devices related to a sales account code.

The system can further comprise computer instructions to provide a master to-do list for all sales persons, generated for a facility manager.

It is also contemplated that the system can comprise computer instructions to automatically generate thank you letters for one or more particular customers.

Further, the system can comprise computer instructions for compiling tracked time for all sales account codes per sales opportunity, computing the duration when all available sales account codes are acting on sales opportunities, and computing sales in dollars over time. The computations can comprise sales per account code, sales per facility, sales by company, and combinations thereof.

Computer instructions can also be included for compiling closing ratios utilizing data from sales person opportunities consummated, facility opportunities consummated, product viewings versus sales consummated, advertising opportunities generated by type of advertising compared to sales consummated, a portion of an address of a customer and combinations thereof. The closing rations can be calculated by zip code analysis.

It is also contemplated that the system can also include the steps of tracking the type of advertising that brought in a customer, the product category, the average number of items per sale per customer, the average fabric protection purchased per customer, accessory sales per sales account code, warranty sales per sales account code, delivery and set up fees per sales account code, square footage of items sold per sales account code, and comparing the averages per sales account code to the total average of all sales account codes used in the system.

It is additionally contemplated that before a sales person is permitted to approach a new customer on the sales floor the sales person is required to answer specific questions regarding the previous customer the sales person was last assigned to. These questions can range from the type of advertising that brought the customer to the store, the type of product that the previous customer was browsing for, if a sale was made how much the sale was made for, the zip code of the customer, and other relevant questions.

Referring now to FIG. 1, a schematic chart depicting an overview of the system is shown. A processor (10) is connected to both data storage (12) and an input device (13). While FIG. 1 depicts a single processor and a single input device, it is contemplated that multiple processors or input devices may be used by the system.

An input device can be a personal digital assistant (PDA), a wireless phone, a blackberry™, a palm computer, a laptop computer, a pager, a cellular phone, a land phone, another computer, a web interface, or combinations thereof.

Data storage (12) contains numerous computer instructions. Computer instructions for receiving sales commitments (22) receive sales commitments and related information from sales account code (23). Sales account code (23) can represent a facility, a particular showroom, a designated group of sales people, or an individual sales person.

Computer instructions for tracking sales commitments by date, hour, minute, and second (24) also receive input from sales account code (23). The date, hour, minute, and second can be determined by clock means (27), which is also contained in data storage (12).

Data storage (12) also includes computer instructions for tracking the steps of the sales process (25). The steps of the sales process can include greeting of a customer, qualification of the customer, needs analysis of the customer, presentation of product, service or both product and service to the customer, demonstration of product, service or both product and service to the customer, and trial close.

Data storage (12) also includes computer instructions for receiving individual sales data by date, hour, minute, and second on an ongoing basis (26).

Further, Data storage (12) includes Computer instructions for tracking total time spent with each customer by sales account code (28) and computer instructions for compiling an average of the total time spent with each customer by sales account code (29), using input from sales account code (23).

Data storage (12) also includes computer instructions for providing a logical comparison between sales data, steps of the sales process, and sales commitments (30), in relationship to clock means (27). The logical comparison can be established using a discrete event modeling and simulation method to monitor and forecast individual sales corresponding to sales account code (23).

The data storage (12) also includes computer instructions to provide at least one alarm (31) to both sales account (23) and a secondary sales account (33). Secondary sales account (33) can represent a manager of at least one sales person. The computer instructions to provide at least one alarm (31) can provide an alarm in response to sales data reflecting sales occurring below sale commitments. It is contemplated that the computer instructions to provide at least one alarm (31) can provide an alarm in other circumstances as well.

Data storage (12) can also include computer instructions for providing customer data (35) to sales account code (23). The customer data can include an event that brought in the customer, items that were viewed by the customer, the amount of sales relating to the customer, at least a portion of the customer's address, any reasons for inconclusive sale with the customer, or any combination thereof.

The computer instructions for providing customer data (35) can also prevent the sales account code (23) of a sales individual from being entered into a queue to greet new customers on a sales floor if the sales account code (23) fails to supply customer data to the system or steps of the sales process taken by the sales person associated with the sales account code (23).

Data storage (12) can also include computer instructions to provide an overflow analysis report (32). An overflow analysis report can indicate when all sales account codes are currently engaging customers on the sales floor.

FIG. 2 shows the main window (100) for the system to allow the user to enter customer data. The main window also allows the system to keep track of sales person commitments. The main window is divided into numerous sections. The "on deck" section (101) lists the personnel that are not "on the floor". The list of the "on deck" personal appears in the "on deck" box (102) along with the time.

The "on the floor" section (103) lists the personnel who are currently on the sales floor. The list of the "on the floor" personal appears in the "on the floor" box (104).

Personnel are moved from the "on deck" box (102) to the "on the floor" box (104) by pressing the "move to floor", "move to deck", "personal trade", and "change rotation" buttons (106).

FIG. 2 also shows the sales information section (108) in the main window (100). The sales information section (108) allows the user to start an opportunity file on a customer. The user can enter the zip code, invoice ID number, item quantity, and sales figures in this section.

If the customer is a repeat customer, the user can press the repeat customer button (109) to obtain a customer ID number if the customer has already been entered into the system. The user can additionally click on the customer details button (128) to retrieve information about a customer from the customer ID section (130) or the customer name section (132).

FIG. 2 also shows that the user has the option of identifying the result of a customer's visit. The user has the option of pressing the "Sale Made" button (110) or the "Split Sale" button (112) depending on the outcome of the customer's visit. The user then can add more information to the system by choosing options from three separate categories: advertising category (116), product category (118), and reason category (120).

The advertising category (116) covers how the customer discovered the enterprise or what event brought that customer into the enterprise. The product category (118) covers what items interested the customer. The reason category (120) covers the reason for inconclusive sale with customer.

The sales information section (108) also allows the user to enter the zip code of the customer and the dollar amount of actual sales by the customer. The zip code, actual sales, and the categories begin to define a given customer in the system's database. The main window (100) facilitates the customer and opportunity tracking.

The user is given the option to open a new opportunity file by pressing the open opportunity button (124), to save the file by pressing the save opportunity button (122), and to enter an opportunity by pressing the enter opportunity button of (126).

Figure 3:
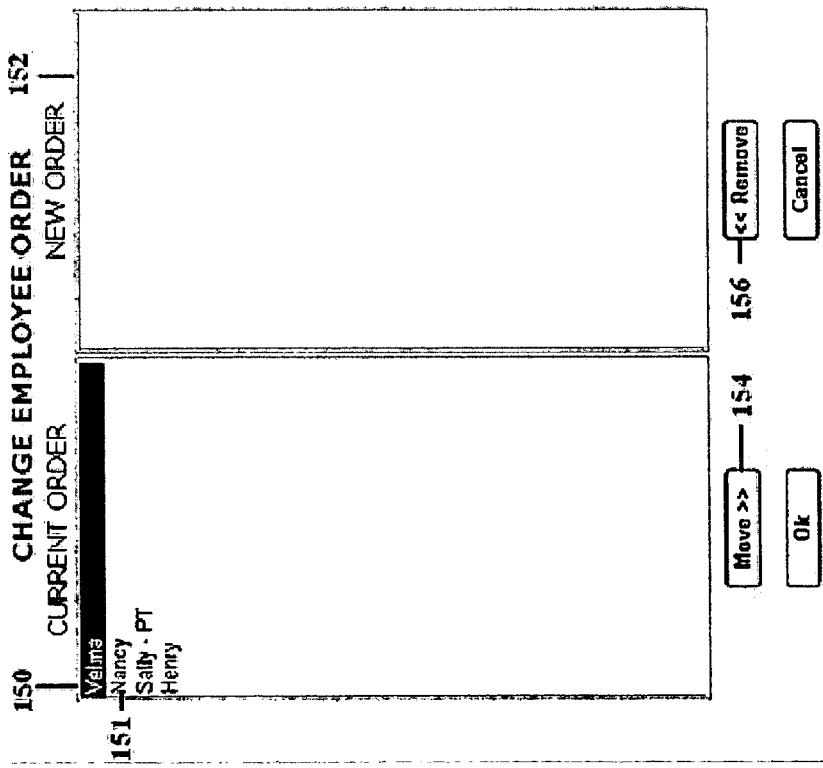
FIG. 3 shows the system's screen to change employee order.

FIG. 3 shows a screen to change employee order (160). From the current order window (150) a name (151) can be selected and moved to the new order window (152). This move can be done by clicking on the "move" button (154) and "remove" button (156) at the bottom of the page.

Figure 4:
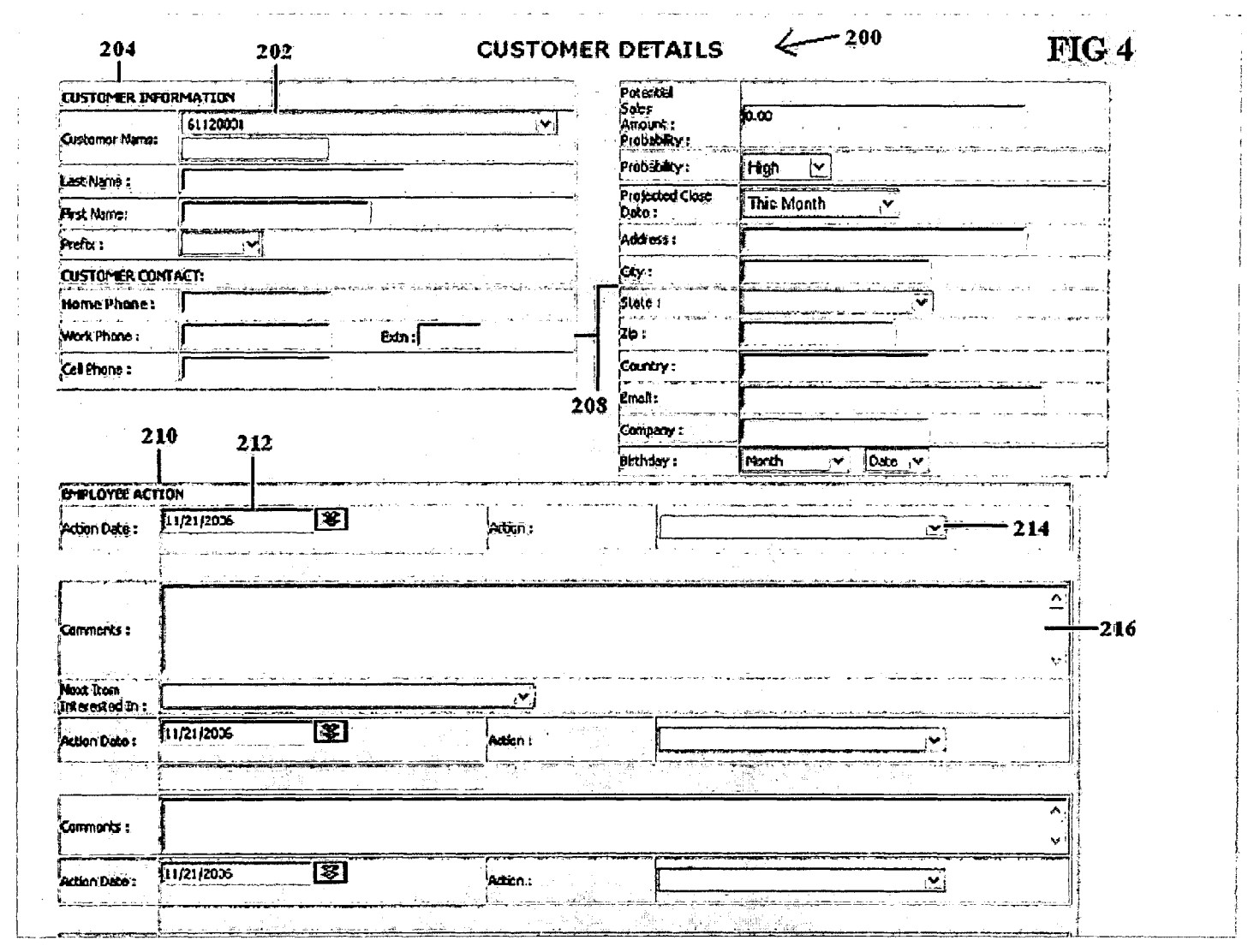

FIG. 4 shows the system's customer details window (200). The customer ID number (202) identifies each separate customer. The customer ID number can be presented in a pull-down mode so the user can easily switch between various customers.

FIG. 4 also shows that the customer details window (200) is separated into sections. One section is the customer information section (204). The customer information section (204) contains the last name, the first name, and any name prefix associated with that customer.

The customer contact section (206) contains the home telephone number, work telephone number, and fax number for the customer. The next section, the customer address section (208), lists the street address, city, state, zip code, country, e-mail, and company of the customer. The customer address section (208) can also include the customer's date of birth, and forecasted sales probabilities relating to the customer. The customer address section (208), as shown in FIG. 4, can also contain a cross-reference box that acts as a short reminder for the user about the customer.

The last section in the customer details window (200) is the employee action window (210). The employee action window (210) allows the system to alarm sales commitments for an action to be taken by a sales person. The employee action window (210) has a pull-down mode to list the last action date (212) and last action (214) taken by the enterprise with regard to the specific customer. The employee action window (210) also has a space for general comments (216) to be entered by the user about the customer.

As FIG. 4 shows, the employee action window (210) shows this data for the last three actions taken with this customer. If the user presses the customer data print button (not shown), all of the data in the employee action window (210) is printed.

Figure 5:
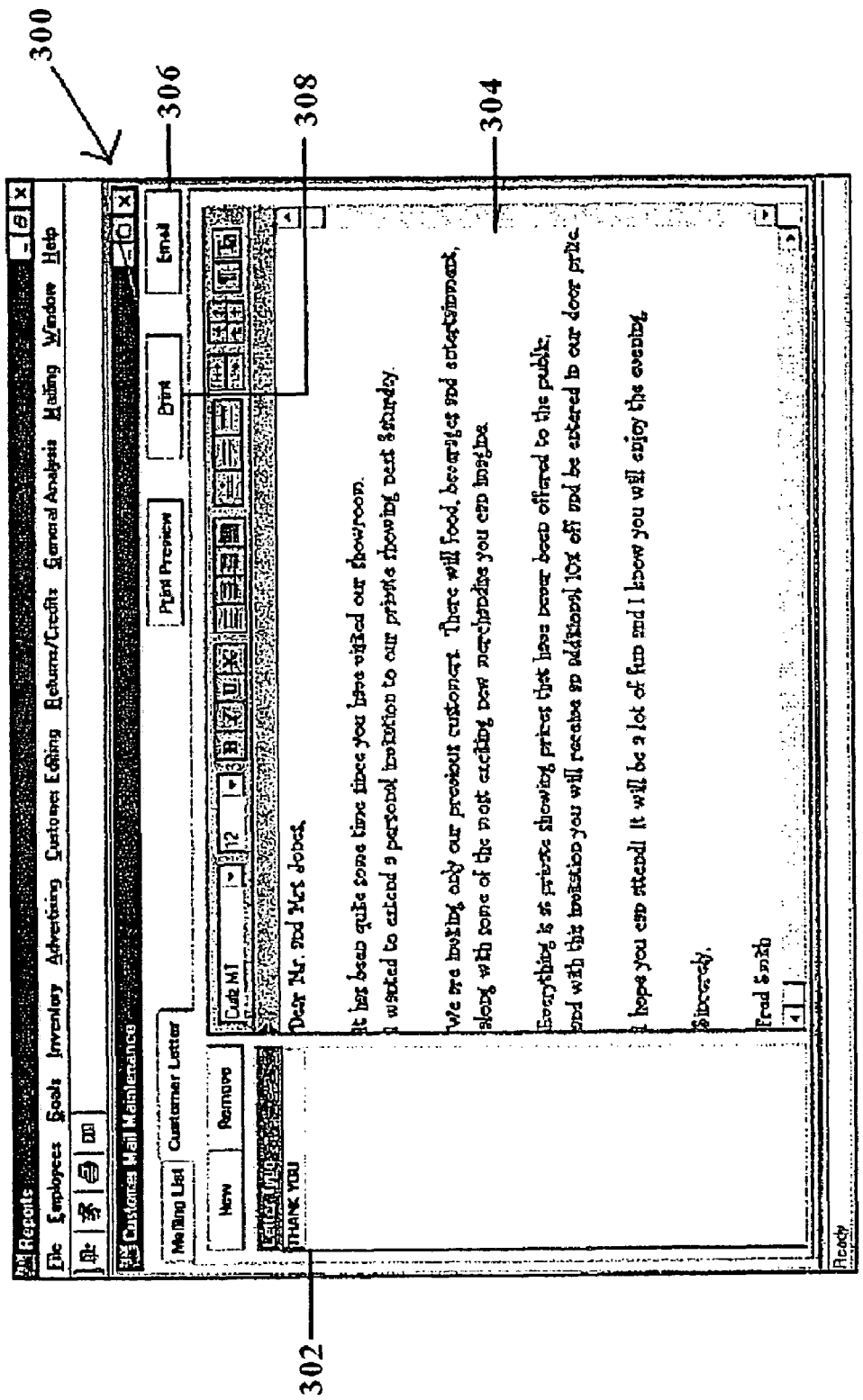
FIG. 5 shows the system's customer mail maintenance window.

The customer relationship management invention can be varied where the action taken is sending a letter, sending an email, making a phone call and combinations thereof. FIG. 5 represents shows how the actions in the system are specifically performed.

FIG. 5 depicts the customer mail maintenance window (300). The user first can choose a letter type from the letter type box (302). The system can also generate a customized thank you letter to a particular customer. If the user chooses a letter type, a standard letter will appear in the letter box (304). The user can also opt not to choose a selection from the letter type box (302), and may instead compose a letter from scratch in the letter box (304). The user may also print the letter for mailing by pressing the print button (308) or e-mail letter by pressing the e-mail button (306)

Figure 6:
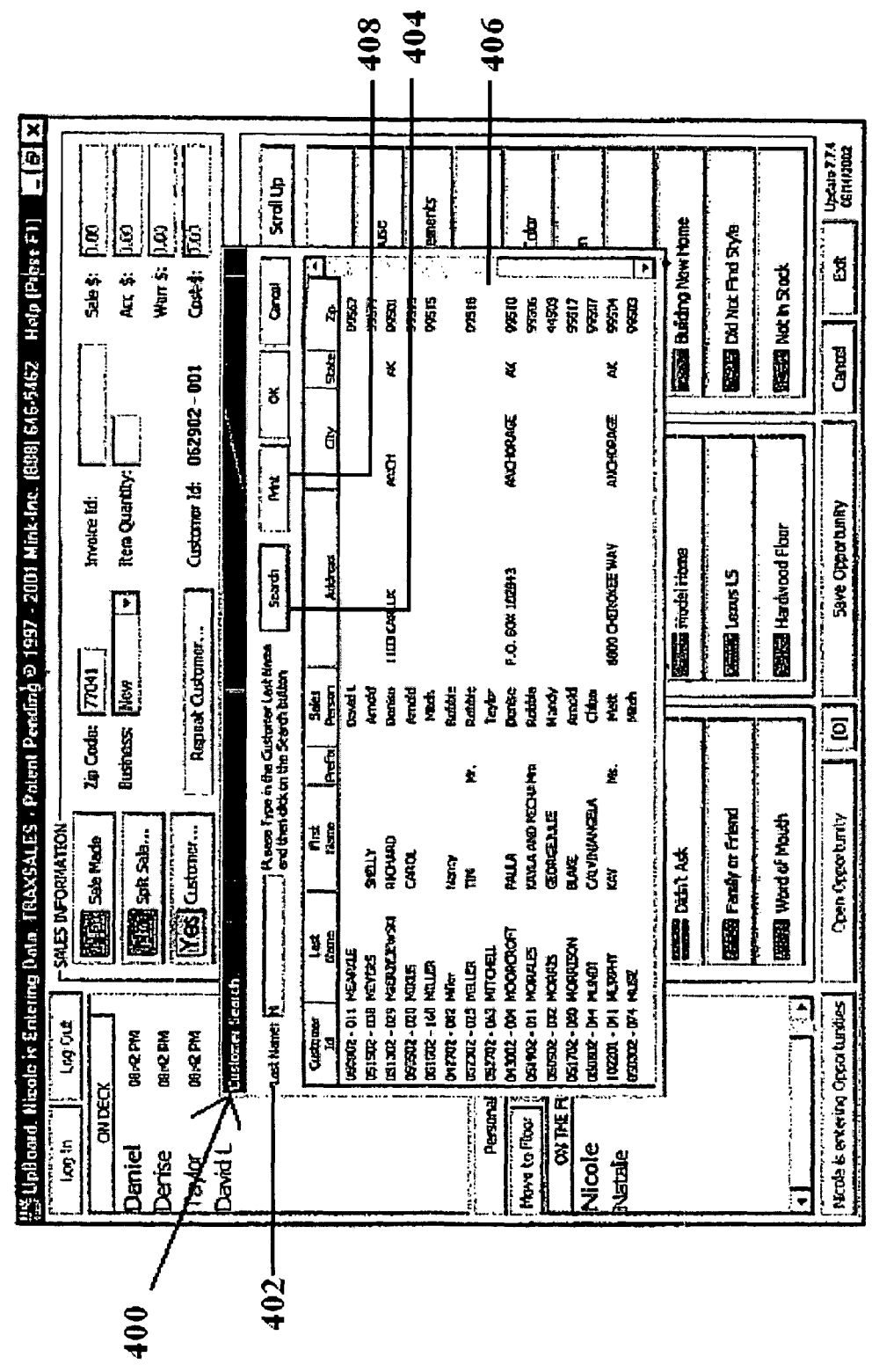

To facilitate finding customers, the system can include a step where the user uses a built-in search engine to find a particular customer. FIG. 6 depicts the customer search window (400).

The customer search window (400) allows the system to form a "to do" list for a sales person. Additionally, a facility manager can create a master "to do" list for all sales persons using the customer search window (400). The user types the last name of the customer in the last name box (402) and then presses the search button (404). The program searches the entered name and returns the list of names that fit the search in the search results window (406). The results window organizes the search data in alphabetical order per last name.

As shown in FIG. 6, the search results window (406) also displays each listed customer's ID number, first name, prefix, the sales person who last contacted the customer, and the customer's address including street city, state, and zip code information. By the pressing the results print button (408), the user can print the data in search results window (406).

The invention is also a system for tracking sales opportunities, assigning sales opportunities to a salesperson, and measuring individual sales and individual customer activity. The system includes providing customer data for each customer such as an event that brought in a customer, items viewed by a customer, dollar amount of actual sales for a customer, zip code of a customer, and reasons for inconclusive sale with a customer.

The system can also provide a reward mechanism for sales persons that supply the customer data. The system can also provide a time tracking mechanism for tracking at least one sales person at a facility, tracking total hours worked by all sales persons per facility, tracking total hours worked by all sales person per facility over a defined period, tracking time spent per sales opportunity per salesperson, compiling tracked time for all sales persons per sales opportunity, computing the duration when all available sales persons are acting on sales opportunities, and computing sales in dollars over time.

The computations can include: sales per salesperson, sales per facility, sales by company, and combinations thereof.

The system can involve compiling closing ratios utilizing data from sales person opportunities consummated, facility opportunities consummated, product viewings versus sales consummated, advertising opportunities generated by type of advertising compared to sales consummated, zip code of customer, and combinations thereof.

Figure 7:
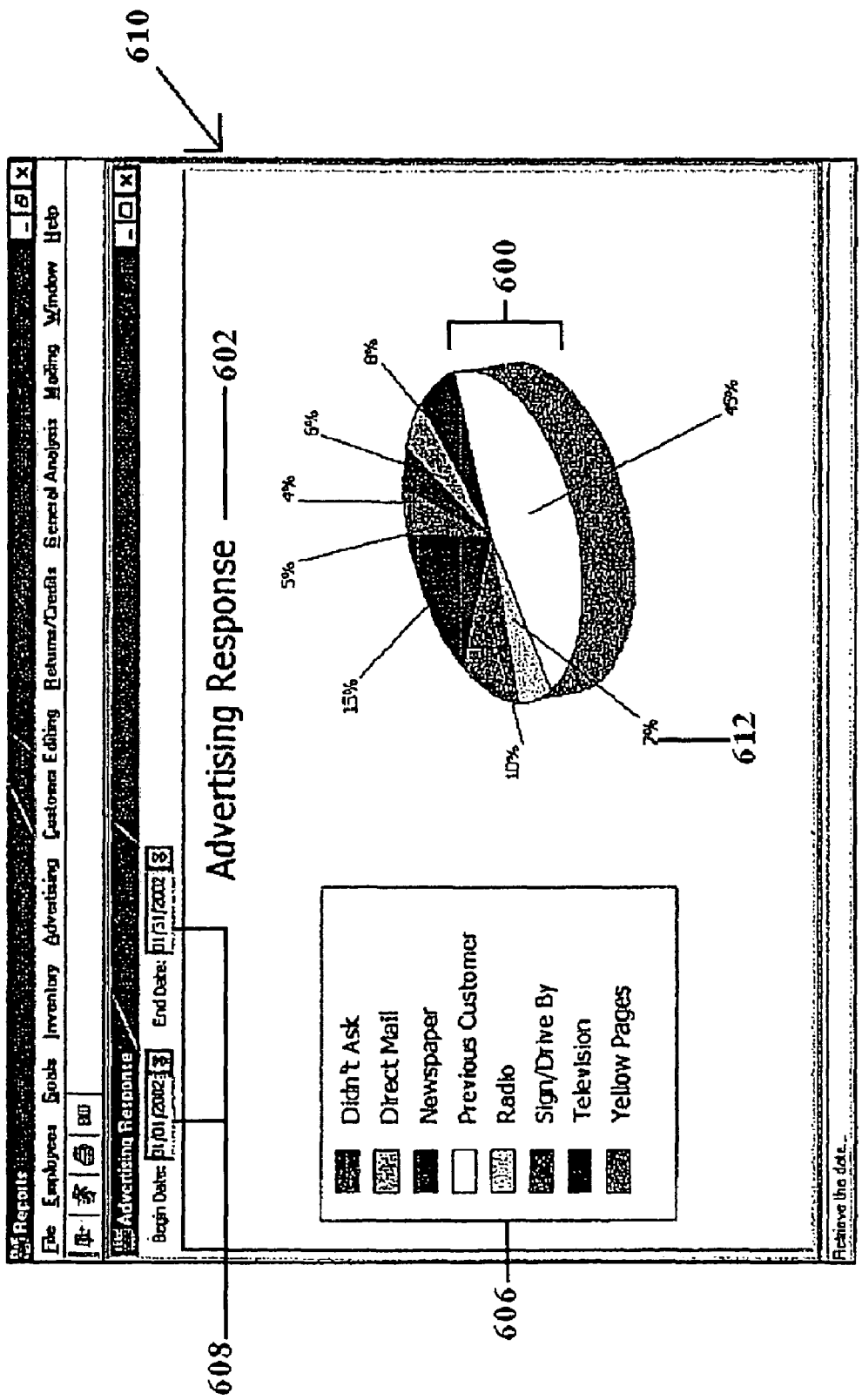
FIG. 7 shows an example of the system's pie graph.

The system analyzes the data input by the users and can represent the values in graphical form. FIG. 7 shows an example of a pie graph report produced by the system. The depicted pie graph (600) displays data for a given date range chosen by the user using the calendar pull-down windows (608). The pie graph (600) is displayed in the middle of the pie graph window (610). The pie graph labels (612) are, in fact, the calculated values for a given category and are given a size in a relative statistical relationship to the other categories.

The coloring coding of the pie graph (600) corresponds to the colors and labels in the pie graph legend (606) located next to the pie graph (600). The system can also add an appropriate title (602) to the pie graph (600).

Though FIG. 7 depicts an advertising response pie graph (600), FIG. 7 is merely illustrative. The system can produce pie graph reports relating to all of the various analyses computed by the system. The pie graph can also be shown as a basic chart.

Figure 8:
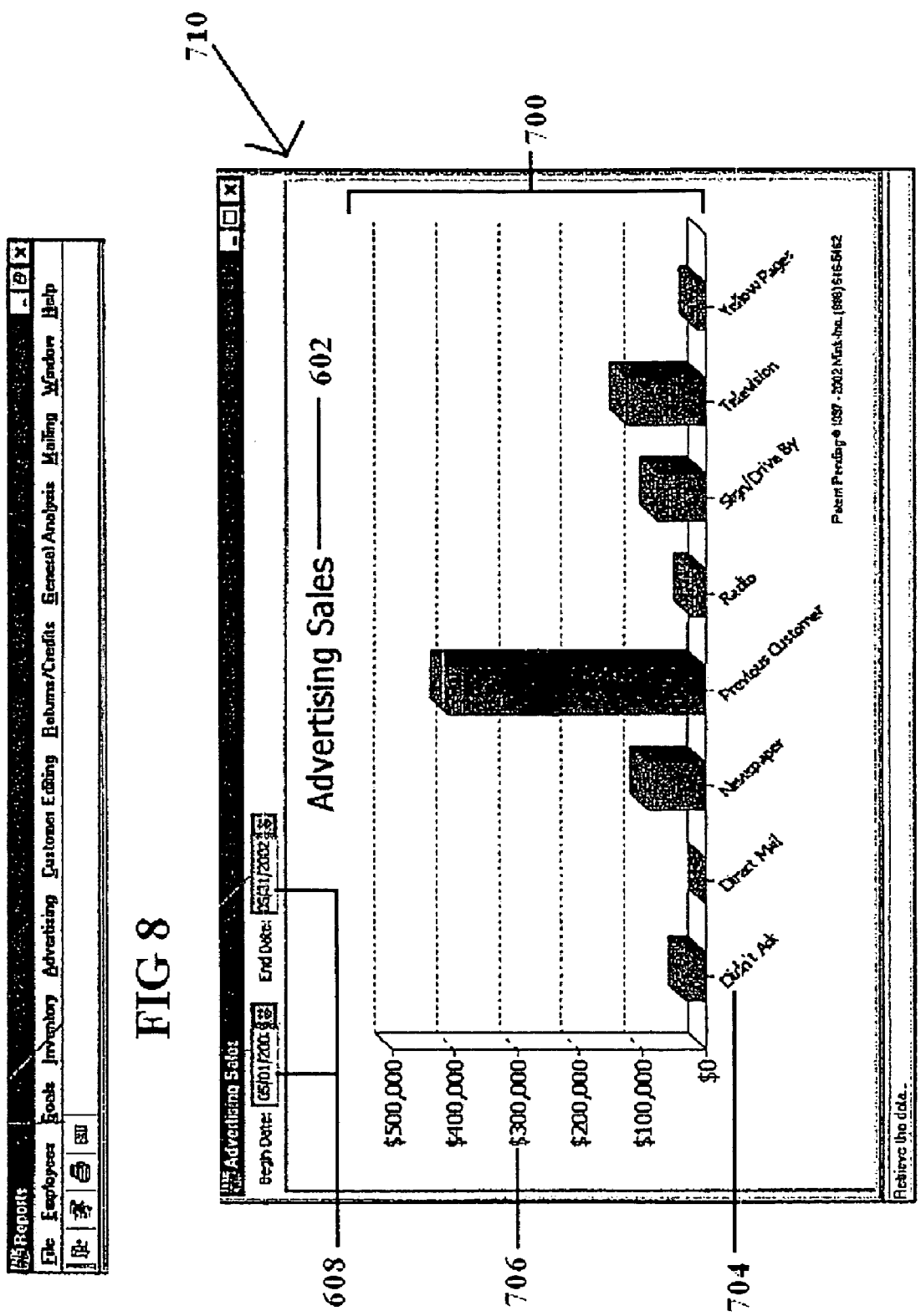
FIG. 8 shows an example of the system's bar graph.

FIG. 8 shows an example of a bar graph report produced by the system. For a given date range, chosen by the user using the calendar pull-down windows (608), the system can generate a bar graph (700). The bar graph (700) is displayed in the middle of the bar graph window (710). The bar graph category labels (704) appear at the bottom of the bar graph (700) beneath each respective bar.

The height of each bar corresponds to the bar graph calculated values (706) labeled on the side of the bar graph (700). The system can also add an appropriate title (602) to the bar graph (700).

Even though FIG. 8 depicts an advertising response bar graph, FIG. 8 is merely illustrative. The system can produce bar graphs relating to all of the various analyses computed by the system. The bar graph can also be shown as a basic chart.

The system also is capable of printing out various reports for the user. FIG. 9 depicts an example of a formatted chart report produced by the system. In particular, FIG. 9 depicts a performance summary report (800).

At the top of the page, the report contains the report title (802), the creation date (804) of the report, and the date range (806) corresponding to the data summarized in the report. The sales persons are listed individually in alphabetical order in a salesperson column (808) on the left side of the report (800). Next to each sales person's name, the report (800) lists the calculated PPO (810), or performance per opportunity, corresponding to each sales person as calculated by the system.

The remainder of the data shown in the performance summary sheet (800) is raw data that supports the calculation of the PPO (810). This data includes hours (812), total sales (814), accessories net amount (816), and accessories sales ratio (818).

The report (800), as shown in FIG. 9, also contains raw numerical columns (820), listing number of sales, items, opportunities, and personnel trades, and shows the calculated personnel trade ratio (822) computed using these numbers. Further, the report (800) lists warranty information (824) on sales such as the number of warranties, warranty amounts, warranty ratio. The report (800) also lists the percent of warranties compared to total sales (826) calculated using these numbers.

Lastly, the performance summary report (800) lists the average sale value (828), items per sale (830), sales per hour (832), and the closing ratio (834).

Even though FIG. 9 depicts a performance summary report (800), FIG. 9 is merely illustrative. The system can produce reports for the all of the various analyses computed by the system.

Figure 10:
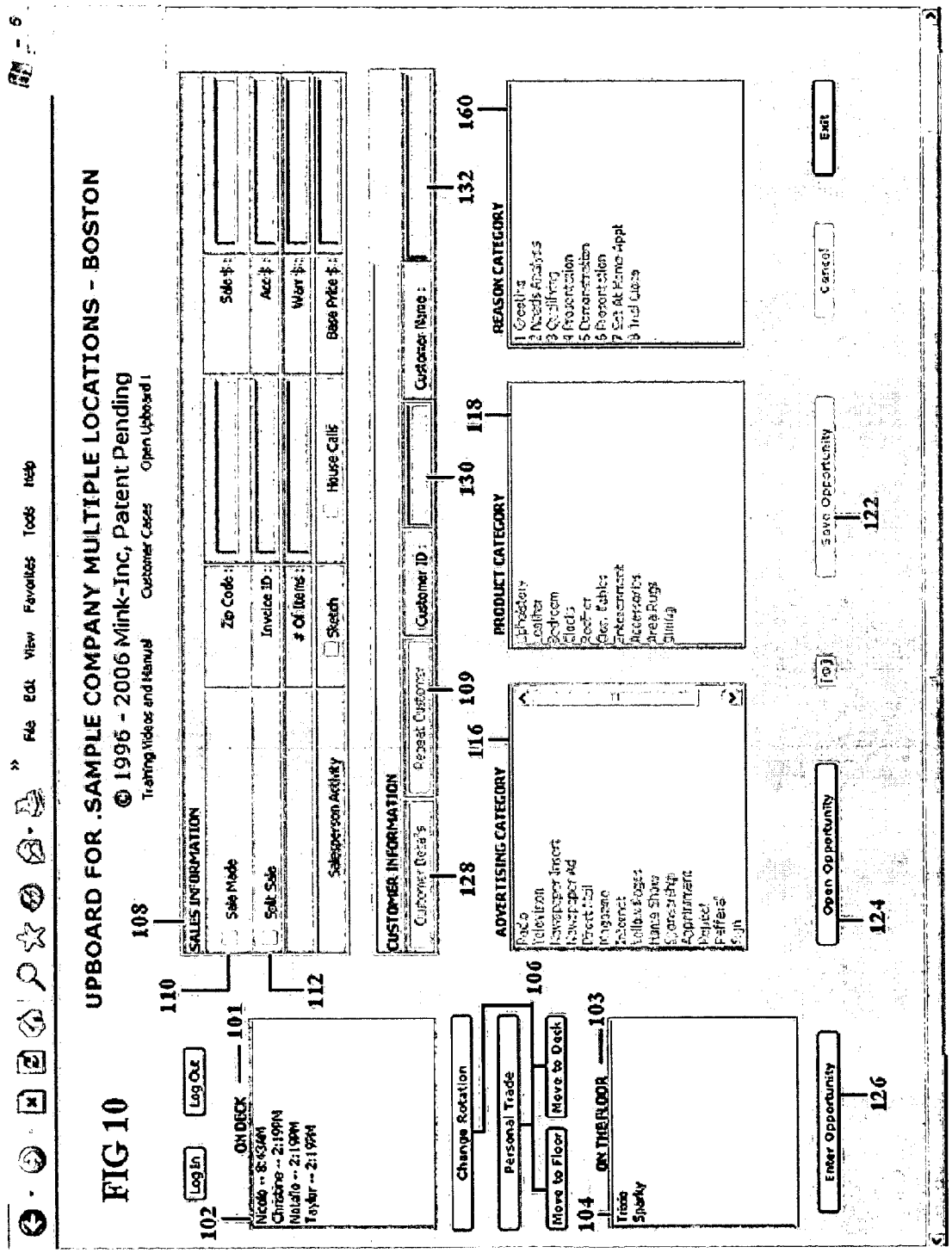
FIG. 10 shows the system's main window to allow the user to enter customer data.

FIG. 10 shows the main window (100) for the system to allow the user to enter customer data. The main window also allows the system to keep track of sales person commitments. The main window is divided into numerous sections. The "on deck" section (101) lists the personnel that are not "on the floor". The list of the "on deck" personal appears in the "on deck" box (102) along with the time.

The "on the floor" section (103) lists the personnel who are currently on the sales floor. The list of the "on the floor" personal appears in the "on the floor" box (104). Personnel are moved from the "on deck" box (102) to the "on the floor"

box (104) by pressing the "move to floor", "move to deck", "personal trade", and "change rotation" buttons (106).

FIG. 10 also shows the sales information section (108) in the main window (100). The sales information section (108) allows the user to start an opportunity file on a customer. The user can enter the zip code, invoice ID number, item quantity, and sales figures in this section.

If the customer is a repeat customer, the user can press the repeat customer button (109) to obtain a customer ID number if the customer has already been entered into the system. The user can additionally click on the customer details button (128) to retrieve information about a customer from the customer ID section (130) or the customer name section (132).

FIG. 10 also shows that the user has the option of identifying the result of a customer's visit. The user has the option of pressing the "Sale Made" button (110) or the "Split Sale" button (112) depending on the outcome of the customer's visit. The user then can add more information to the system by choosing options from three separate categories: advertising category (116), product category (118), and reason category (160). The reason category (160) differs from the reason category (120) in FIG. 2 because the reasons that a sales person can enter are different. Each of these categories can be altered to fit the need of a particular client.

The advertising category (116) covers how the customer discovered the enterprise or what event brought that customer into the enterprise. The product category (118) covers what items interested the customer. The reason category (120) covers the reason for inconclusive sale with customer.

The sales information section (108) also allows the user to enter the zip code of the customer and the dollar amount of actual sales by the customer. The zip code, actual sales, and the categories begin to define a given customer in the system's database. The main window (100) facilitates the customer and opportunity tracking.

The user is given the option to open a new opportunity file by pressing the open opportunity button (124), to save the file by pressing the save opportunity button (122), and to enter an opportunity by pressing the enter opportunity button of (126).

The system for tracking sales opportunities, assigning sales opportunities to a salesperson, and measuring individual sales and individual customer activity can also track items per sale per customer, fabric protection per customer, accessory sales per sales person, warranty sales per sales person, delivery and set up fees per sales person, square footage of items sold per sales person, and comparing the averages per sales person to the total average of all sales persons.

The invention is a system for measuring advertising effectiveness compared to product sales starting with creating a budget per type of advertising and calculating a cost per opportunity by dividing the number customers responding to a type of advertising by the amount budgeted per type of advertising.

Next, the method involves calculating a cost per sale by dividing the number of customers purchasing a product due to a type of advertising by the amount budgeted per type of advertising, determining closing ratios of each type of advertising by using the number of customers responding to each type of advertising, dividing that number into the number of sales per group of customers responding to that type of advertising, and determining sales per product category based on advertising type.

The system allows the user to enter some basic advertising information into the maintenance section of the system. An advertising response report displays the percentages of gross sales generated by each type of advertising. An advertising sales report displays the total gross generated by each form of advertising. The user can use this report to better determine the return on investment from each form of advertising.

An advertising sales by product report compares what types of advertising works best for an individual product category. This report is useful if an advertising campaign promotes a singular product category.

The invention is also a system for measuring units of product viewed by a customer and comparing this amount with units of product purchased by a customer. This is done by computing the number of customers viewing a product category, dividing that computed number by the number of sales, and calculating by salesperson individual activity by product category to determine a personal closing ratio. The method ends by calculating by facility by product category to determine a facility-closing ratio and comparing the personal closing ratio to the facility-closing ratio.

The invention is also a system for tracking sales goals by tracking individual sales goals, tracking showroom sales goals, and tracking company-wide sales goals.

The invention is also a system for tracking customer reasoning concerning a purchase by tracking reasons for delayed purchase, tracking reasons for buying at another store, and tracking reasons to not purchase.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

What is claimed is:

1. A system for tracking sales, tracking sales activity without purchase, and enhancing customer relationships, comprising:
   a. at least one processor;
   b. data storage connected to the at least one processor;
   c. at least one input device connected to the at least one processor and data storage, wherein the date storage further comprises:
      i. computer instructions for receiving at least one sales commitment from at least one sales account code using the at least one input device;
      ii. computer instructions for tracking the at least one sales commitment input by date, hour, minute, and second, for each at least one sales account code;
      iii. computer instructions for tracking steps of the sales process, wherein the steps of the sales process comprise: greeting of a customer, qualifications of the customer, needs analysis of the customer, presentation of product, service or both product and service to the customer, demonstration of product, service or both product and service to the customer, and trial close;
      iv. computer instructions for receiving individual sales data by the at least one sales account code by date, hour, minute and second on an ongoing basis;
      v. clock means for generating a time record linked to the computer instructions, wherein the clock means comprise a date, hour, minute and second when the at least one sales commitment is received by the processor and when individual sale data is received by the processor;
      vi. computer instructions for tracking total time spent with each customer by the at least one sales account code;

vii. computer instructions for compiling and average of total time spent with each customer by at least one sales account code;

viii. computer instructions for providing a logical comparison between sales data, steps of the sales process, and the at least one sales commitment, in relationship to the clock means, said logical comparison being established using a discrete event modeling and simulation method to monitor and forecast at least one individual sale corresponding to the at least one sales account code;

ix. computer instructions to provide at least one alarm to at least one client device related to the at least one sales account code and to at least one secondary sales account code when sales data reflects sales occurring below the at least one sale commitment;

x. computer instructions for providing customer data for a customer to at least one selected sales account code, wherein the customer data comprises: an event that brought in the customer items viewed by the customer; dollar amounts of actual sales by the customer; at least a portion of an address of the customer; and reasons for inconclusive sales with customer;

xi. computer instructions to prevent the at least one sales account code of a sales person from being entered into a queue to greet a new customer on a sales floor if the at least one sales account code fails to supply customer data to the system and steps of the sales process taken by the sales person associated with the at least one sales account code; and xii. computer instructions to provide an overflow analysis report indicating when all sales account codes are engaging at least one customer on a sales floor.

2. The system of claim 1, wherein the computer instructions for tracking a sales process by steps of the sales process, further comprise a step selected from the group comprising: sketching a customer installation, setting up a house call, or combinations thereof.

3. The system of claim 1, wherein the discrete event modeling and simulation method comprises:
computer instructions to enable sales to be customized relative to a type of company;
computer instructions to enable the at least one individual sales person to work with multiple customers simultaneously;
computer instructions to enable the at least one individual sales person to log into and access the system without being tracked by the system;
computer instructions to provide a continuously rotating priority queue for at least one sales account code in real time wherein the at least one sales account code identifies which sales person is designated to approach a new customer on a sales floor;
computer instructions to provide a notice to at least one client device corresponding to at least one sales account code of the at least one sales person located in a defined zone to approach a new customer on a sales floor.

4. The system of claim 1, wherein the at least one processor is in communication with a network.

5. The system of claim 1, wherein the atleast one processor pushes the computer instructions to provide at least one alarm, simultaneously through at least two internet gateway protocols to communicate with at least two different client devices related to at least one sales account code simultaneously.

6. The system of claim 1, wherein the at least one sales account code represents a facility, a particular showroom, a designated group of sales people, or an individual sales person.

7. The system of claim 1, wherein the at least one client device is a personal digital assistant (PDA), a wireless phone, a blackberry™, a palm computer, a laptop computer, a pager, a cellular phone, a land phone, another computer, a web interface, or combinations thereof.

8. The system of claim 7, wherein the at least one secondary sales account code represents a manager of at least one sales person.

9. The system of claim 1, wherein the at least one alarm is a member of the group consisting of: e-mail, a to-do report, a printed notice, a standardized report, a faxed reports directly from the processor, and combinations thereof.

10. The system of claim 9, wherein the client device is the input device.

11. The system of claim 9, wherein the at least one alarm is a member of the group consisting of: a voice message on a client device.

12. The system of claim 1, wherein the at least one alarm is transmitted automatically on a real time basis.

13. The system of claim 1, further comprising computer instructions to provide a master to-do list for all sales persons that is generated for a facility manager.

14. The system of claim 1, further comprising computer instructions to automatically generate at least one thank you letter for at least one customer.

15. The system of claim 1, further comprising the step of tracking by at least one sales account code a member of the group consisting of: type of advertising that brought in a customer, product category, average number of items per sale for the customer, average fabric protection purchased by the customer customer, accessory sales per at least one sales account code; warranty sales per at least one sales account code; delivery and set up fees per at least one sales account code; square footage of items sold per at last one sales account code; and comparing the averages per at least one sales account code to the total average of all sales account codes used in the system.

16. The system of claim 15, wherein the closing ratios are performed by zip code analysis.

17. The system of claim 16, further comprising computer instructions for:
compiling tracked time for all sales account codes per sales opportunity;
computing a duration when all available sales account codes are acting on sales opportunities; and
computing sales in dollars over time, wherein said computations comprise:
sales per sales account code, sales per facility, sales by company, and combinations thereof;
compiling closing ratios utilizing data from a member of the group consisting of: sales person opportunities consummated, facility opportunities consummated, product viewings versus sales consummated, advertising opportunities generated by type of advertising compared to sales consummated, a portion of an address of a customer and combinations thereof.

18. A system for tracking sales, tracking sales activity without purchase, and enhancing customer relationships, comprising:
a. at least one processor;
b. data storage connected to the at least one processor;

c. at least one input device connected to the at least one processor and data storage, wherein the data storage further comprises:
   i. computer instructions for receiving at least one sales commitment from at least one sales account code using the at least on input device;
   ii. computer instructions for tracking the at least one sales commitment input by date, hour, minute, and second, for each at last one sales account code;
   iii. computer instructions for tracking steps of sales process, wherein the steps of the sales process comprise: greeting of a customer, qualification of the customer, needs analysis of the customer, presentation of product, service or both product and service to the customer, demonstration of product, service or both product and service to the customer, and trial close;
   iv. computer instructions for receiving individual sales data by the at least one sales account code by date, hour, minute, and second on an ongoing basis;
   v. clock means for generating a time record linked to the computer instructions, wherein the clock means comprise a date, hour, minute, and second when the at least one sales commitment is received by the processor and when individual sale data is received by the processor;
   vi. computer instructions for tracking total time spent with each customer by the at least one sales account code;
   vii. computer instructions for compiling an average of total time spent with each customer by the at least one sales account code;
   viii. computer instructions for providing a logical comparison between sales data, steps of the sales process, and the at least one sales commitment, in relationship to the clock means said logical comparison being established using a discrete even modeling and simulation method to monitor and forecast at least one individual sale corresponding to the at least one sales account code, wherein:
      a. the computer instructions provide a continuously rotating priority queue for at least one sales account code in real time wherein the art at least one sales account code identifies which sales person is designated to approach a new customer on a sales floor; and
      b. the computer instructions provides a notice to at least one client device corresponding to at least one sales account code of the at least one sales person located in a defined zone to approach a new customer on a sales floor;
   ix. computer instructions to provide at least one alarm to at least one client device related to the at least one sales account code and to at least one secondary sales account code when sales data reflects sales occurring below the at least one sales commitment;
   x. computer instructions for providing customer data for a customer to at least one select sales account code, wherein the customer data comprises: an event that brought in the customer; items viewed by the customer; dollar amount of actual sales by the customer; at least a portion of an address of the customer; and reasons for inconclusive sale with the customer;
   xi. computer instructions to prevent the at least one sales account code of a sales person from being entered into a queue to greet a new customer on a sales floor if the at least one sales account code fails to supply customer data to the system and steps of the sales process taken by the sales person associated with the at least one sales account code; and
   xii. computer instructions to provide an overflow analysis report indicating when all sales account codes are engaging at least one customer on a sales floor.

19. The system of claim 18, wherein before the sales person is permitted to approach the new customer on the sales floor the sales person is required to answer specific questions regarding the previous customer the sales person was last assigned to.

* * * * *